United States Patent [19]
Wheeler

[11] 3,813,969
[45] June 4, 1974

[54] TOOL HOLDER FOR BORING AND TURNING POLYGONAL SHAPED SURFACES

[76] Inventor: Harold E. Wheeler, 119 N. Elmira St., Athens, Pa.

[22] Filed: May 11, 1971

[21] Appl. No.: 142,179

[52] U.S. Cl. ................................ 82/19, 82/1.3
[51] Int. Cl. ................................... B23b 5/44
[58] Field of Search ..................... 82/19, 1.3, 38

[56] References Cited
UNITED STATES PATENTS

| | | | |
|---|---|---|---|
| 1,102,538 | 7/1914 | Mulligan | 82/19 |
| 2,487,994 | 11/1949 | Trevena | 82/19 |
| 3,110,200 | 11/1963 | Sturmberg | 82/1.3 |
| 3,511,121 | 5/1970 | Meyer et al. | 82/19 |
| 3,576,144 | 4/1971 | Stratt | 82/38 |

Primary Examiner—Leonidas Vlachos
Attorney, Agent, or Firm—George R. Douglas, Jr.

[57] ABSTRACT

A polygonal box tool for use with lathes or other machine tools of the character wherein the work is rotated about its axis. The box or housing is provided with a holder for a cutting tool, movement of the holder transversely of the box being controlled by a cam member journaled in the body portion of the box. The cam is driven by the lathe spindle, and is formed with a groove of contour to generate the desired shape on or in the workpiece.

Variation of the size of the polygonal work surface is accomplished by means of an adjustable cam follower pin fitted into the groove of the cam. As the cam revolves, it imparts a reciprocatory motion to the tool holder, with respect to the center of the work.

8 Claims, 16 Drawing Figures

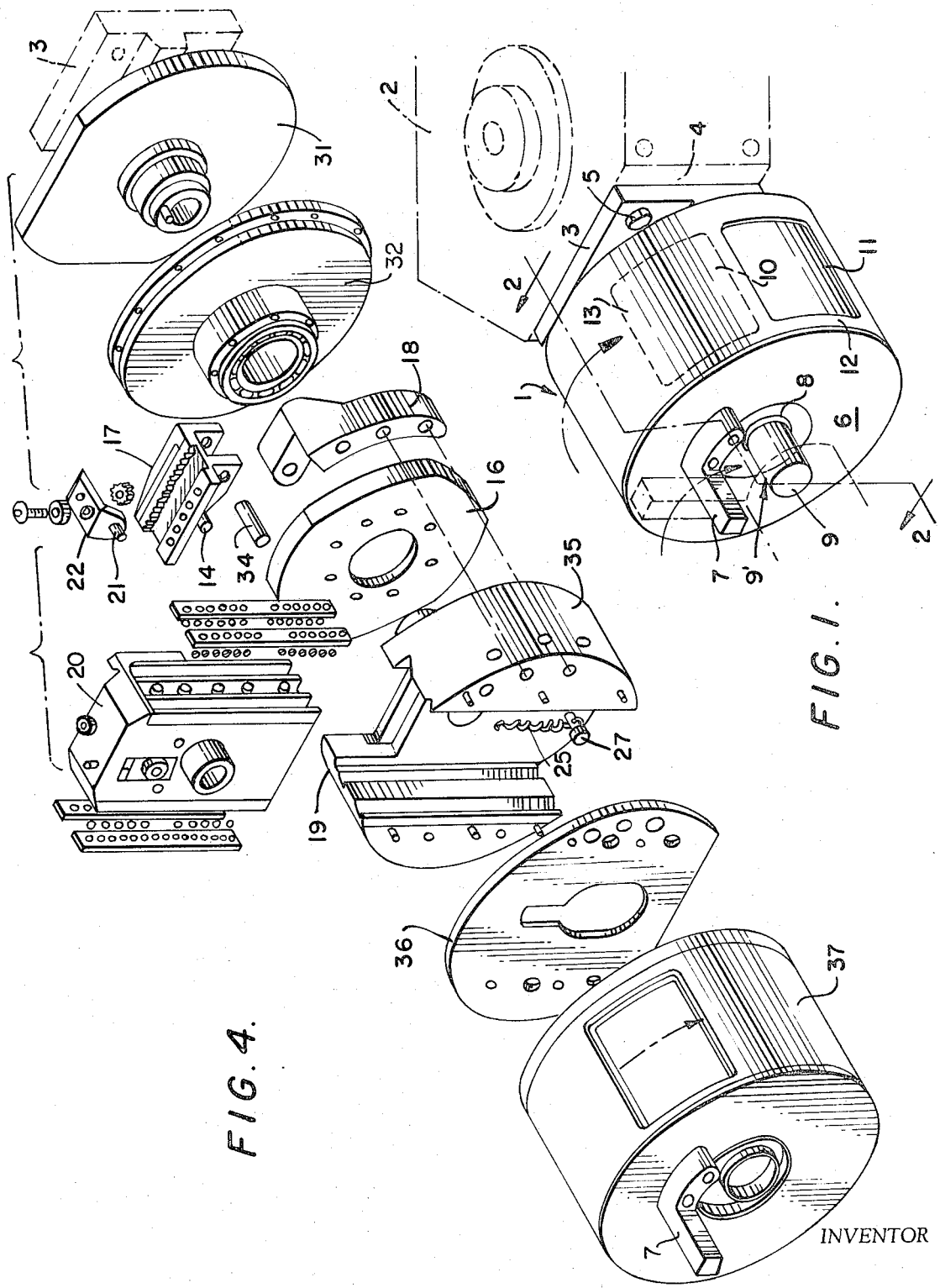

INVENTOR
HAROLD E. WHEELER

BY

ATTORNEYS

INVENTOR
HAROLD E. WHEELER

INVENTOR
HAROLD E. WHEELER
BY
ATTORNEYS

PATENTED JUN 4 1974 3,813,969

INVENTOR
HAROLD E. WHEELER

BY

ATTORNEYS

INVENTOR
HAROLD E. WHEELER

BY *Gershon J. O'Boyle*
*James J. O'Boyle*

ATTORNEYS

TOOL HOLDER FOR BORING AND TURNING POLYGONAL SHAPED SURFACES

BACKGROUND OF THE INVENTION

In my U.S. Pat. Nos.: 2,906,156, issued Sept. 29, 1959, for BOX TOOLS, and 3,009,373, issued Nov. 21, 1961, for TOOL HOLDER FOR BORING AND TURNING POLYGONAL SHAPED SURFACES, the cam member disclosed in each of these patents is driven by the lathe spindle, and is formed with a face of contour to generate a desired shape on or in the work. The adjustable cam follower arrangement comprises a knife edge carried by a support member pivotally mounted on the box or housing for the tool, and the amplitude of movement of the knife edge, when it is reciprocated by rotation of the cam, depends upon the difference between the diameters across the corners and the flats, respectively, of the cam. A second knife edge is adjustably mounted upon an arm operatively connected to the support for the first-mentioned knife edge, said second knife edge having bearing engagement with a fitting operatively connected to the tool holder. Otherwise stated, adjustment of the position of the second knife edge on its support changes the effective length of the fulcrum arm defined by the pivot point of the fixed knife support and the boring point of the second knife so that the degree of movement of the tool carrying slide transversely of the box, is proportionately varied.

While the devices of the above-noted patents perform their intended functions in a satisfactory manner, I have found, after considerable research and experimentation, that the formation of surfaces of polygonal shape in cross-section, either externally or internally of the work, can be accomplished economically and efficiently by means of the improved cam and adjustable cam follower arrangement of the present invention, in conjunction with an improved box or housing design, together with rearrangement of the components therein.

SUMMARY OF THE INVENTION

The combination of the grooved cam and associated follower pin is an important feature of the present invention since it not only permits use of a single cam for various sizes of polygonal shaped work surfaces, but also eliminates the need of providing separate cams for boring and turning, respectively, for the reason that the inner race of the cam is employed for boring and the outer race for turning.

In order to maintain the cam follower pin in contact with the inner race of the cam, when boring internal polygons, a light extension spring is employed for the purpose of overcoming any "play" or slight loose motion which may develop between the adjustable slide pin and the slide member. The slide is actuated outwardly and inwardly by the cam groove, thus providing a more positive control than the spring bias formerly used. When turning polygonal surfaces on the work piece, the cam follower pin is retained in contact with outer race of the groove by means of a compression spring.

The tool holder housing is of cylindrical shape and is driven by the lathe chuck jaw or other abutment, whereby to rotate the grooved cam and thus impart a reciprocating motion to the tool holder with respect to the center of the work.

The box tool is a self-contained unit; the cam and cam follower arrangement, together with the transverse slide, the micrometer adjusting mechanism, and other components are mounted within the housing, access thereto being had through an open window formed in the housing cover member, constructed and arranged to fit over the body portion of the tool in telescopic relationship therewith. A corresponding opening is formed in the body of the holder in the area thereof opposite the micrometer adjusting means, when the opening in the cover is brought into alignment with the opening in the body portion of the holder.

Normally, the openings are not in aligned position, and more particularly during operation of the tool. When it is desired to obtain access to the interior of the housing, assuming that the tool is at rest, the cover member, while seated in its operative position on the housing, is rotatably displaced to bring the window opening into registration with the corresponding opening in the wall of the housing, whereby access is obtained to the control means, the cam arrangement and other components, for purposes of inspection, repair or substitution.

In the Drawings

FIG. 1 is a perspective view of the box tool secured to the face of a turret lathe, in driving relationship therewith;

FIG. 4 is an exploded perspective view, showing certain of the interior components of the box tool of FIG. 1;

Figure 3:
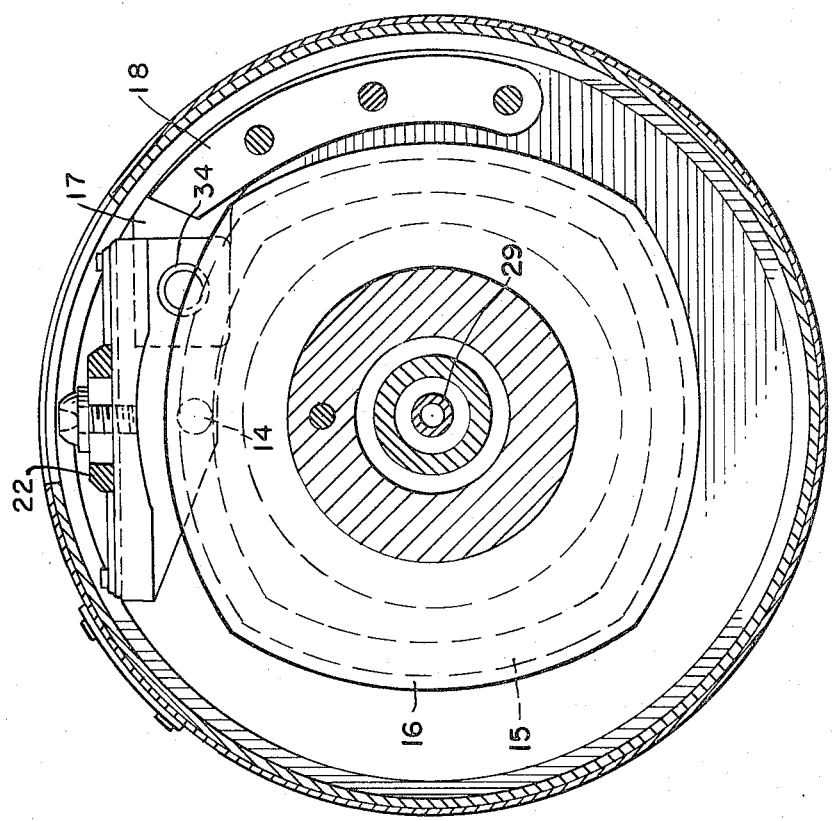
FIG. 3 is a transverse sectional view taken along line 3—3 of FIG. 2.

Referring to the drawings, and more particularly to FIG. 1, the box unit, designated generally by numeral 1, is shown mounted in the operative position on a lathe turret 2, by means of a bracket 3 secured to a face 4 of the turret, by bolts 5 or other fastening means. The tool holder housing 6 is of cylindrical shape, and is driven by the lathe chuck jaw or other member, adapted for driving engagement with an abutment 7 secured to the external housing 8 of the box unit, whereby to rotate the grooved cam and thus impart reciprocating motion to the tool holder having the boring tool 9 with cutter bit 9' seated therein, as will be subsequently described.

The box 1 is a self-contained unit; the cam and cam follower arrangement, transverse slide, micrometer adjusting mechanism, and associated components are mounted within the body portion 10 of the tool, access thereto being had through an open window 11, formed in a band cover 12 fitted over the body portion in telescopic relationship therewith. A corresponding opening 13 is formed in the body of the holder, in the area thereof opposite the micrometer adjusting means, when the opening 11 in the band cover is brought into alignment with the opening in the body member of the holder.

Normally, the openings are not in aligned position. When it is desired to obtain access to the body portion 10, for example to replace the cam, the cover 12 is rotatably displaced to bring the window 11 into register with the opening 13 in the body portion, whereby the control means, the cam arrangement and other interior components are accessible.

Figure 2:
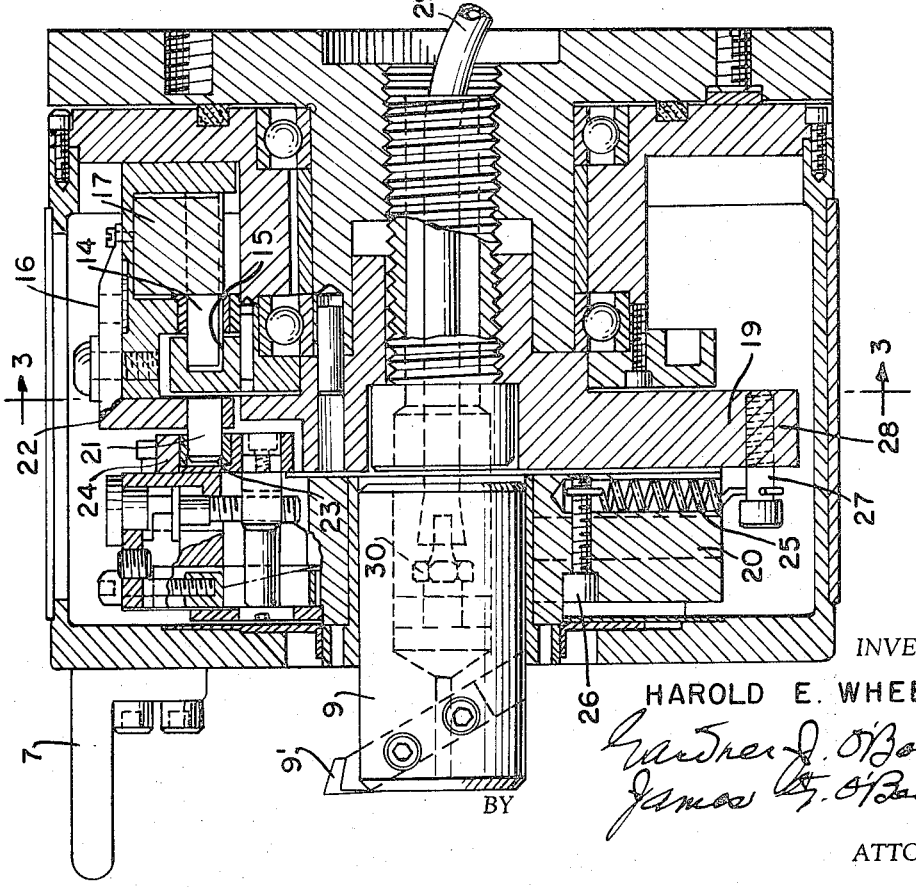
FIG. 2 is a longitudinal sectional view taken along line 2—2 of FIG. 1.

Referring to FIGS. 2 and 3, the cam follower pin 14, FIG. 2, is shown in its operative seated position in the groove 15 of the cam member 16, which groove closely fits the cam follower, and returns the tool holder to its original position, after the rise on the cam has moved it outwardly from the center of the groove. The opposite end portion of the cam follower pin is supported on an arm member 17, FIG. 3, hinged to a support bracket 18 fixedly secured to the housing 19 of the transverse slide 20. The adjustable slide pin 21 is supported on the adjustable cam follower 22, the end portion of the pin being slidably seated in an elongated slot 23 formed in a block member 24 secured to the transverse slide 20 in the vicinity of the cam follower bracket 25 and rearwardly thereof.

In order to maintain the cam follower pin 14 and the adjustable slide pin 21 in contact with the surface of the cam 16 and the surface of adjustable slide 20, a light spring 25' is employed, one end of the spring, FIG. 2, being attached to a top hanger 26 carried by the transverse slide 20, the opposite end of the spring being connected to a bottom hanger 27 supported on the slide housing 28.

An oil hose 29 supplies coolant oil from a source, not shown, to an oil fitting, designated generally by the numeral 30, adapted to supply oil to the workpiece area engaged by the cutter 9' during the boring operation.

Referring to FIG. 4, which is an exploded perspective view of the components of the box tool of FIG. 1, the relative positions of the components are shown for purposes of clarification whereby identification of the type of movement or non-movement of each component of the drive train when the box tool is rotated. The fitting 31 which is secured to the bracket 3 attached to the face 4 of the lathe turret is fixed; the member 32 is rotatably supported on the fitting 31; the support arm 18 (FIG. 3) is fixed; the member 17 which is hinged to the support 18, by means of a pin 34, oscillates; the transverse slide 20 reciprocates; the cam 16 (FIG. 2) rotates; the housing 19 for the transverse slide by means of a spacer 31' rotatably supported on the fixed shaft portion of the fitting, the cover plate 36 which restrains the slide against outward movement, are fixed; and cover member 37 rotates.

Further reference being had to FIGS. 2 and 3, in order to prevent the abutment 7 from losing driving contact with the lathe chuck jaw or other abutment 38, during the boring operation, a brake pressure screw 39 is provided for compressing a friction material 40 against the rotating surface 41, to produce dragging contact therewith and thus maintain the abutment 7 in engagement with the lathe chuck jaw.

Figure 5:
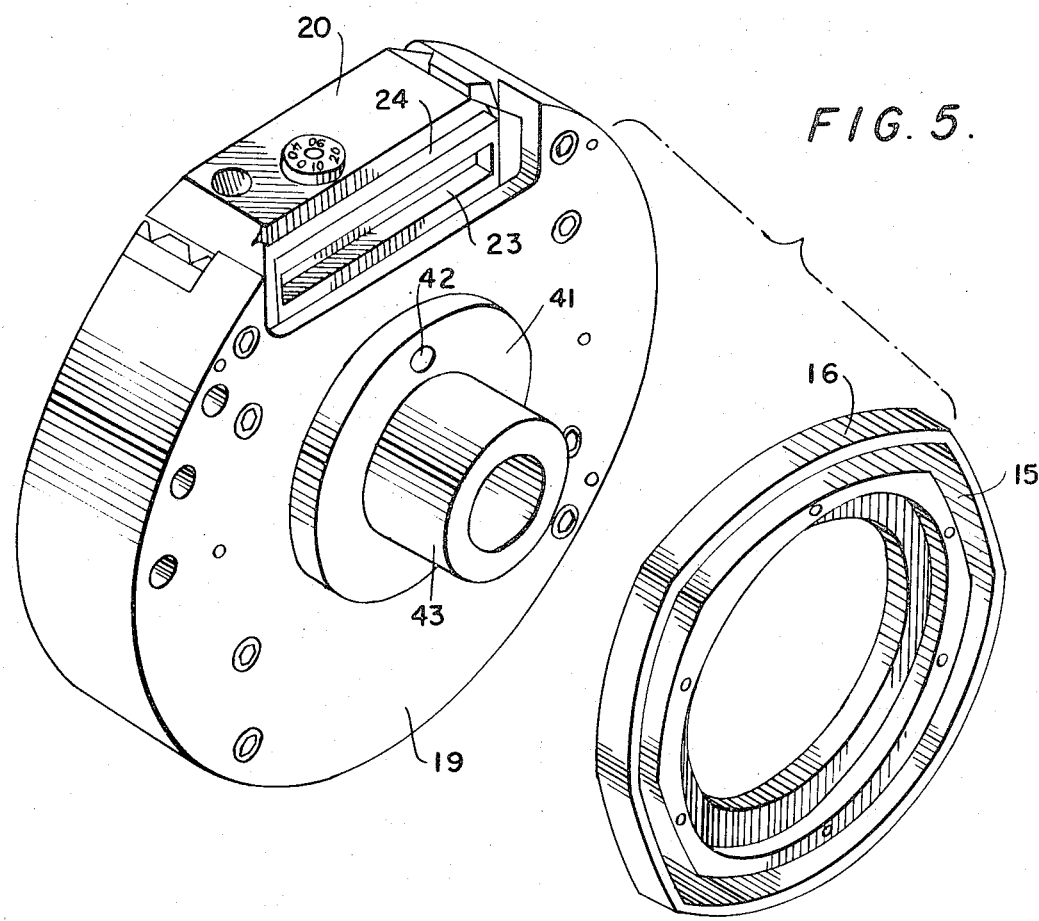
FIG. 5 is a detailed perspective view of the slide guide block, the transverse slide and an associated cam means for reciprocating the slide.

Referring to FIG. 5, the transverse slide 20, in conjunction with the hexagonal cam 16 having groove 15 which seats the cam follower pin 14 (FIG. 2), returns the tool holder to its original position, after the cam has moved it outwardly of the center of the groove as previously described. The elongated slot 23 formed in the block member 24 in the vicinity of the cam follower bracket, seats the adjustable slide pin 21 (FIG. 4) which is supported on the adjustable cam follower, the amplitude of movement of the pin lengthwise of the slot, imparts a reciprocating motion to the tool holder, with respect to the work as will be described hereinafter.

Figure 6:
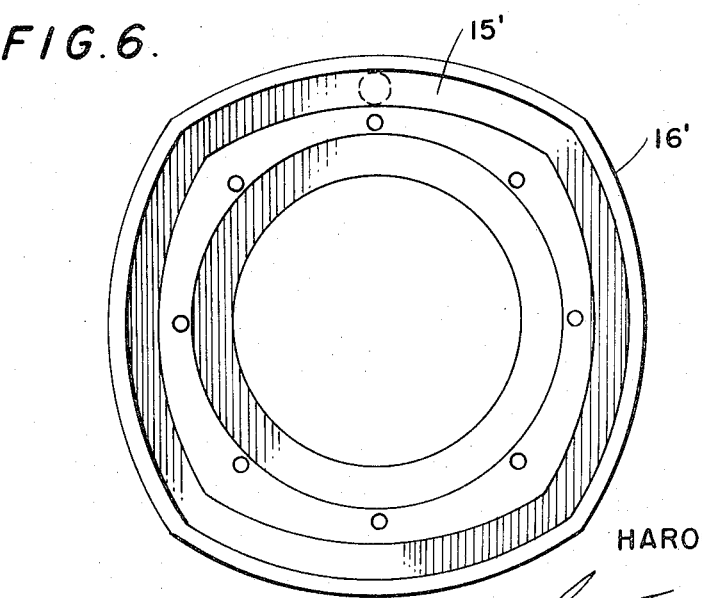
FIG. 6 is an elevational view of a modified cam means adapted for use with the slide guide block and slide arrangement of FIG. 5.

A modified cam 16' for forming a surface of square cross-section externally or internally of the workpiece is shown in FIG. 6.

Figure 7:
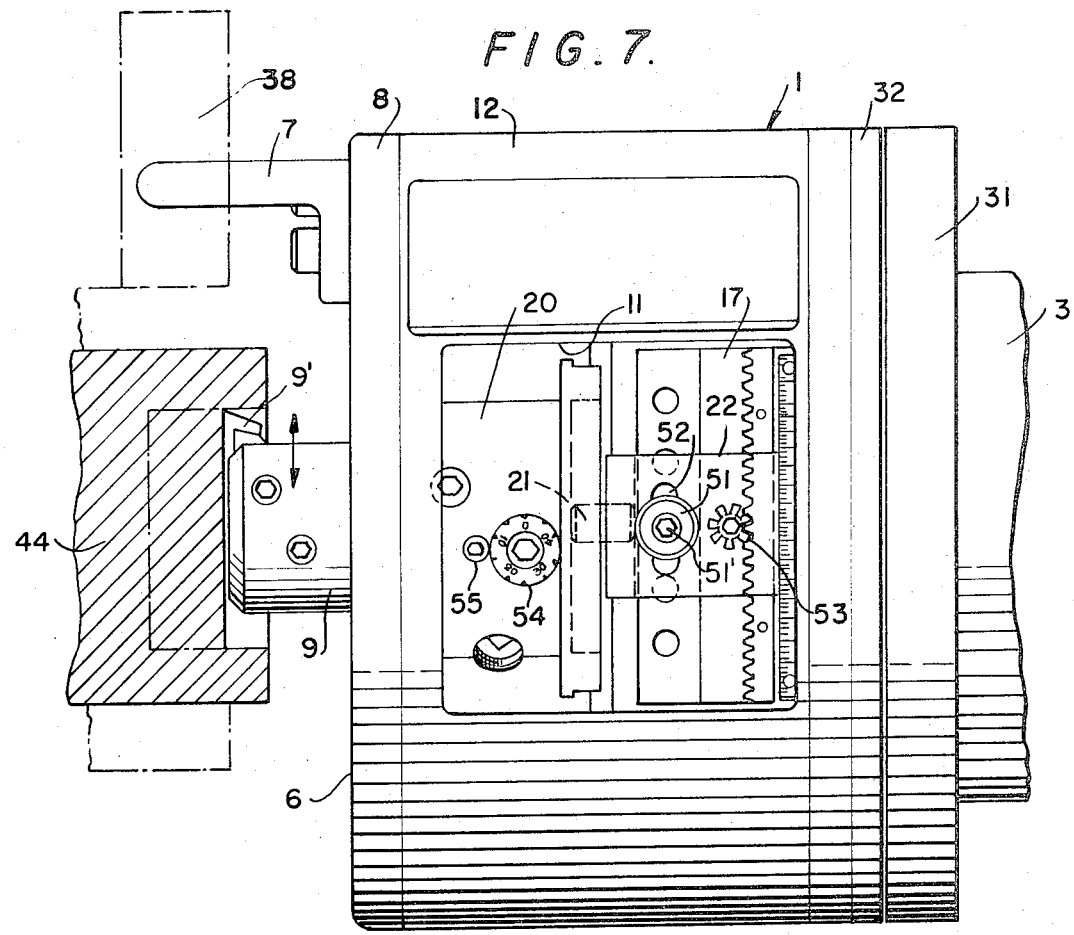
FIG. 7 is a plan view of the tool, showing the opening for access to the interior thereof.

Referring to FIG. 7, the box unit 1 is shown in its operative position with respect to the work, the abutment 38 being in driving relation with the abutment 7 secured to the external housing of the box unit. The adjustable cam follower bracket, designated by numeral 45, comprises an elevating rack 46 having graduations 47 extending lengthwise of the top portion thereof, the bottom edge 48 being serrated to define teeth 49 engageable with a pinion 50 supported on the adjustable cam follower 22, is moved laterally with respect to the bracket 45, to determine the size of the polygonal surface to be formed on the workpiece. A rough adjustment is made by a manually moveable cap member 51 having a pin 51' threaded into the adjustable cam follower. This adjustment is accomplished by releasing the cap from its fixed position with respect to the elongated slot 52, and moving it to the right or left to bring the scibe line pointer 53 to approximate desired position, and then moving it to exact position by means of the micrometer adjusting means 54, and retained in fixed position by a pin 55 threaded into the cam follower.

Figure 8:
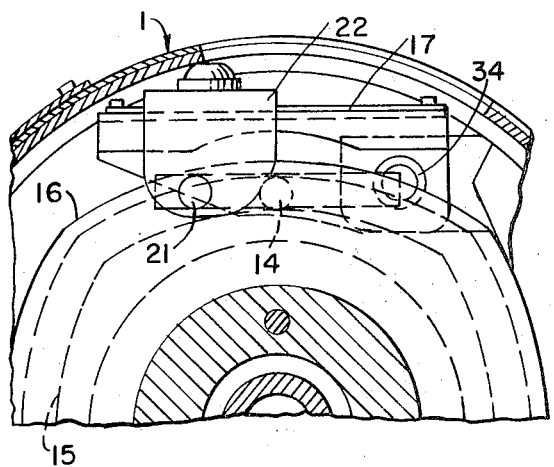
FIGS. 8 and 9 are detailed, transverse sectional views illustrating maximum and minimum amplitude of movement, respectively, of the adjusting means to determine the size of the polygonal surface to be formed on or in the workpiece.
Figure 9:
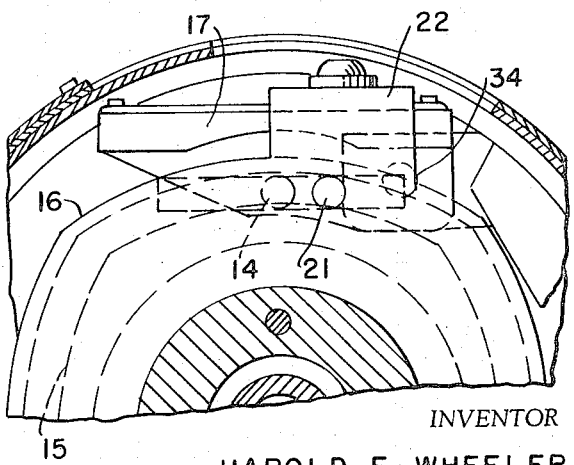

Referring to FIGS. 8 and 9, the adjustable cam follower 22 is shown in the position for minimum and maximum movement, respectively, of the transverse slide.

Figure 10:
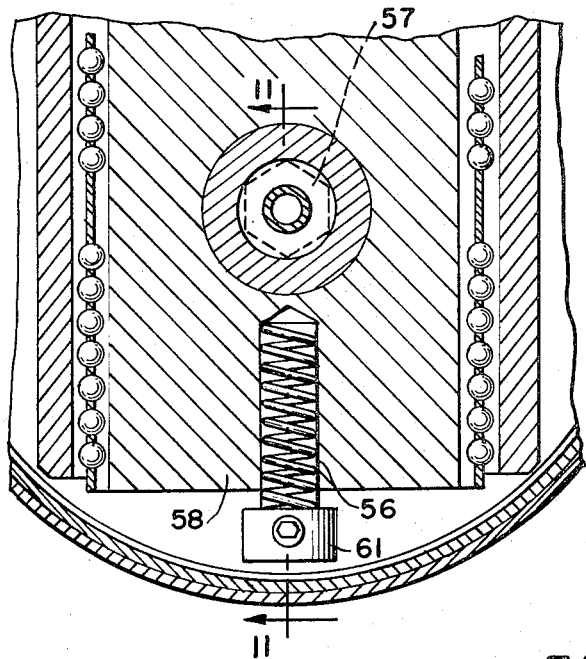
FIG. 10 is a fragmentary vertical sectional view taken through the lower portion of the slide, showing the tension spring employed when turning a polygonal shaped surface on the workpiece.
Figure 11:
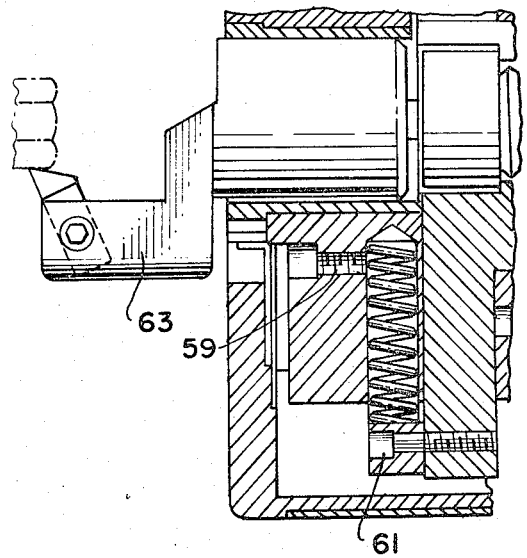
FIG. 11 is a fragmentary sectional view taken along line 11—11 of FIG. 10.

Referring to FIGS. 10 and 11, the compression spring 56, employed when turning a polygonal shaped surface 57, on a workpiece 58, is connected at one end to a pin 59, the bottom of the spring seating on a support member 61 carried by a pin 62 secured to the slide housing. It will thus be seen that as the turning tool 63 rotates, the spring 56 is compressed during a portion of a complete revolution and expands during other portions of the revolution.

Figure 12:
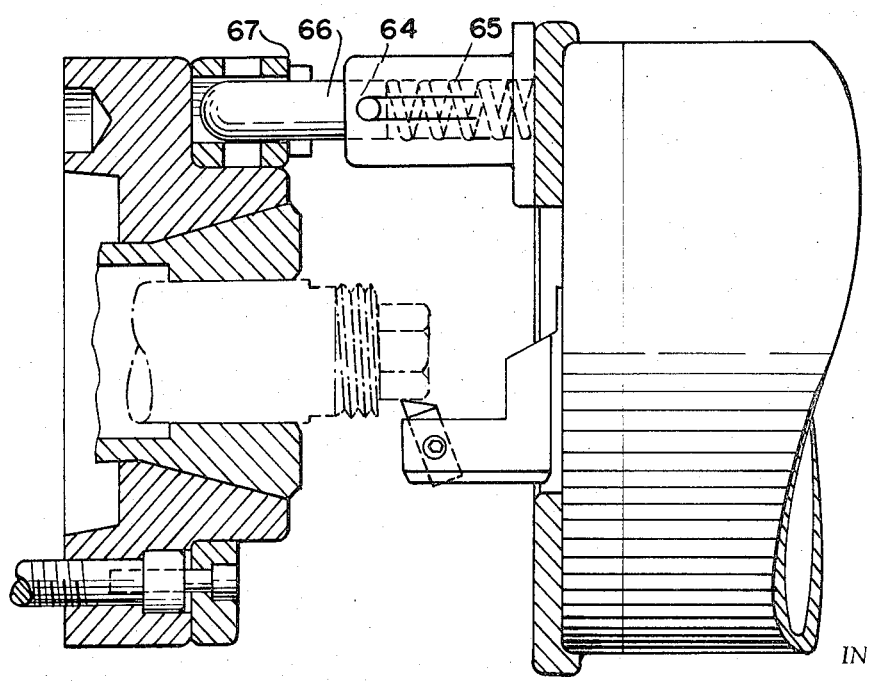
FIG. 12 is a fragmentary sectional view of a modified driving arrangement of the shock absorbing type, wherein the drive pin is spring loaded.
Figure 13:
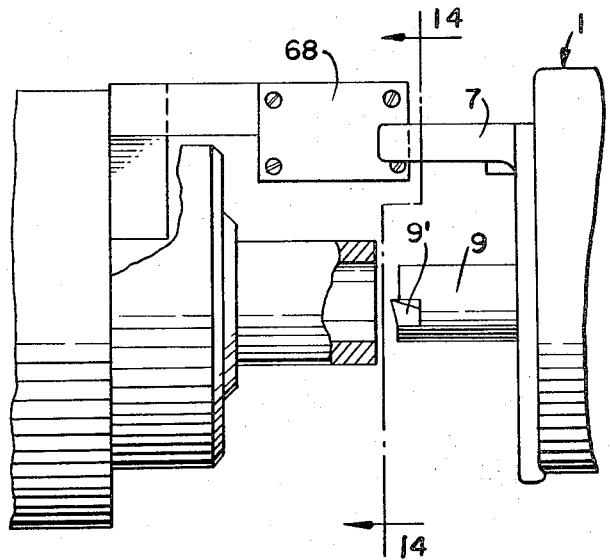
FIG. 13 is a fragmentary sectional view of drive means wherein the driving member is bolted to the lathe spindle nose.
Figure 14:
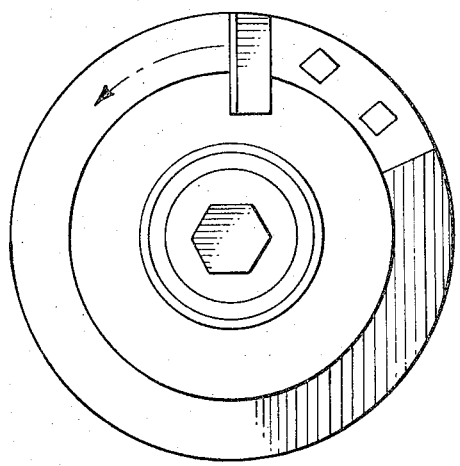
FIG. 14 is a vertical sectional view taken along line 14—14 of FIG. 13.
Figure 15:
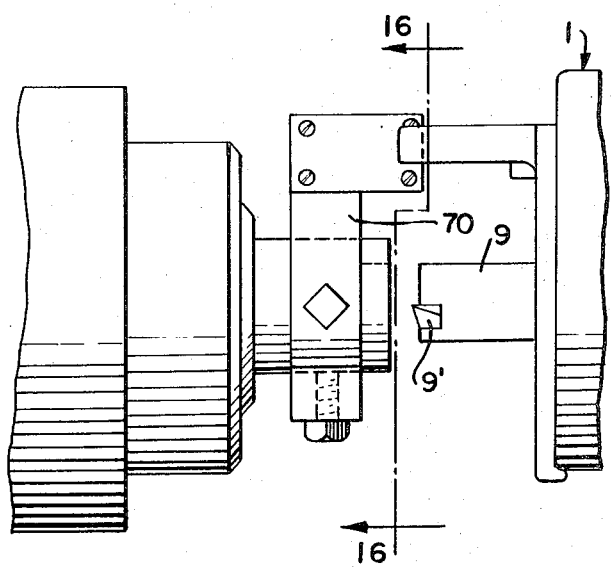
FIG. 15 is a detail view of a dog type drive unit, showing the dog member fitted over the workpiece.
Figure 16:
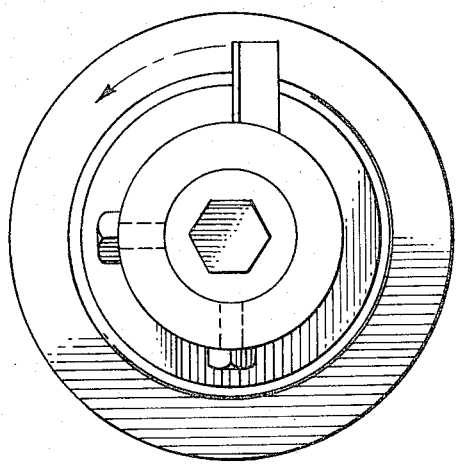
FIG. 16 is a vertical sectional view taken along line 16—16 of FIG. 15.

Referring to FIG. 12, there is shown a pick-up type of shock absorbing driver where the drive pin 64 is spring loaded by means of a coil spring 65, which tends to maintain the end portion 66 of the pin in seated position in a collet hood 67. Another type of drive means is shown in FIGS. 13 and 14, wherein the driving member 68 is bolted to the nose portion 69 of the lathe spindle; and in FIG. 14, a dog type drive unit is employed, the dog member 70 being fitted over the workpiece, and retained by bolt means 71 threaded in seated position with the work, as shown in FIG. 16.

I claim:

1. A tool holder for use in forming surfaces of polygonal shape in cross-section on or in a workpiece, a cylindrically shaped housing (6) being driven by a chuck jaw (38), a cutting tool holder (9) supported in the housing, a polygonal shaped cam member (16) rotatably mounted in the housing and having a continuous groove (15) along a surface of said cam, one face of the cam groove being employed for boring and the other face for turning, cam follower means (17) having a pin member (14) in which one end portion is seated in the groove (15), an adjustable cam follower (22) having an adjustable slide pin (21) having an end portion being slidably seated in an elongated slot (23), the opposite end portion of said cam follower pin member (14) being hingedly secured (17,18) to the housing, a transverse slide (20) containing said elongated slot operatively connected to the cam follower means including the transverse slide (20) having said adjustable slide pin (21) supported on the cam follower means (22) and being reciprocated transversely of the tool holder when rotated, the cam follower pin (14) and the adjustable slide pin (21) being maintained in contact with the surface of the cam member and the elongated slot surface of the adjustable slide (20), respectively, said adjustable cam follower means (22) transmitting a proportional part of the amplitude of movement of the cam member (16) to the cutting tool holder to generate a surface of polygonal shape.

2. In a tool holder in accordance with claim 1, wherein the transverse slide is formed with an elongated slot, and the adjustable slide pin is seated in the slot.

3. In a tool holder in accordance with claim 1, wherein the lathe chuck jaw is in driving engagement with an abutment secured to the external housing of the box unit.

4. In a tool holder in accordance with claim 1, wherein means are provided for maintaining the cam follower pin in contact with the surface of the cam, comprising a light spring having one end attached to a hanger carried by the transverse slide, the opposite end of the spring being connected to a hanger supported on the slide housing.

5. In a tool holder according to claim 1, wherein the means for maintaining the cam follower in contact with the surface of the cam, when turning a polygonal shape on a workpiece comprises a compression spring.

6. In a tool holder according to claim 1, wherein the tool holder housing is formed with an access opening in a band cover fitted over the body portion in telescopic relationship therewith, and adapted to be brought into register with a corresponding opening formed in the body portion of the holder.

7. In a tool holder according to claim 1, wherein means are provided for determining the size of the polygonal surface to be formed on the workpiece.

8. In a tool holder according to claim 1, wherein a brake means is provided to produce dragging contact against the surface of the box housing to maintain the drive abutment in engagement with the lathe chuck jaw.

* * * * *